(12) United States Patent
McKillips

(10) Patent No.: US 10,933,548 B2
(45) Date of Patent: Mar. 2, 2021

(54) MOUNTS FOR KNIFE SHEATHS

(71) Applicant: WHG Properties, LLC, North Wales, PA (US)

(72) Inventor: Neal McKillips, Drexel Hill, PA (US)

(73) Assignee: WHG Properties, LLC, North Wsles (PA)

( * ) Notice: Subject to any disclaimer, the term of this patent is extended or adjusted under 35 U.S.C. 154(b) by 0 days.

(21) Appl. No.: 16/272,661

(22) Filed: Feb. 11, 2019

(65) Prior Publication Data
US 2020/0254640 A1    Aug. 13, 2020

(51) Int. Cl.
*B26B 29/02*    (2006.01)
*F16M 13/04*    (2006.01)

(52) U.S. Cl.
CPC ............. *B26B 29/02* (2013.01); *F16M 13/04* (2013.01)

(58) Field of Classification Search
CPC ........ B26B 29/02; B26B 29/025; B26B 29/04
USPC ......................................................... 224/232
See application file for complete search history.

(56) References Cited

U.S. PATENT DOCUMENTS

| 4,759,483 | A  | * | 7/1988 | Willoughby | ............... | A45F 5/14 224/232 |
| 7,007,352 | B1 | * | 3/2006 | Hill | ........................... | A45F 5/02 24/3.1 |
| 8,297,562 | B1 | * | 10/2012 | Yeates | ....................... | A45F 5/02 224/191 |

* cited by examiner

*Primary Examiner* — Derek J Battisti
(74) *Attorney, Agent, or Firm* — Fox Rothschild LLP

(57) ABSTRACT

The disclosure relates to mounts for knife sheaths. The mounts can be assembled in a first configuration in which the mounts can be strap-mounted; and a second configuration in which the mounts can be mounted on a waist belt. The mounts also permit the orientation of the sheath to be varied.

9 Claims, 17 Drawing Sheets

MOUNTS FOR KNIFE SHEATHS

BACKGROUND

Knives are often safely and conveniently carried in a sheath the covers the knife blade but permits ready access to the knife handle. The sheath may be attached to an article worn or carried by the user, such as a waist belt, belt loop, vest, knapsack, rucksack, etc. Such different types of articles often necessitate different mounting arrangements for the sheath.

For example, a user may wish to carry a sheathed knife on an article of equipment having a gear-attachment mechanism for receiving attachments and accessories. One such gear-attachment mechanism includes the Pouch Attachment Ladder System (PALS), which can be provided on a belt, vest, knapsack or other article of equipment, and typically employs horizontal rows of one-inch nylon webbing spaced one-inch apart and attached to a backing panel at 1.5-inch intervals. PALS webbing defines an array of upwardly and downwardly opening loops. The PALS system is a common component of Modular Lightweight Load-carrying Equipment (MOLLE), which is widely used by both armed forces and civilians. Accessories may be secured to MOLLE webbing via accessory straps that are threaded through the loops.

Alternatively, a user may wish to carry a sheathed knife on the user's waist belt. Mounting a knife sheath to a waist belt may necessitate a different mounting configuration than that used with a MOLLE system, particularly if the waist belt is wider or narrower than the standard one-inch MOLLE webbing. Also, waist belts are usually oriented in a generally horizontal direction, while MOLLE straps allow for a generally vertical orientation.

Under different circumstances and among different articles and different gear-attachment mechanisms, a user may wish to carry a sheathed knife in an orientation other than the typical vertical or horizontal direction. For example, a user may prefer that the knife be canted forward or rearward so that the knife handle can be gripped and drawn more quickly, easily, and securely than would be possible if the knife were in a vertical or horizontal orientation. Thus, there is a need for a more versatile system for mounting a knife sheath to various articles.

SUMMARY

In one aspect, the disclosed technology relates to a mount for supporting a knife sheath from a strap, including: a backing plate having an opening and a plurality of attachment points thereon; a retaining member configured for mounting on the backing plate so that the retaining member spans a portion of the opening and the strap can engage the retaining member by way of the opening; and a plurality of fasteners configured to secure the sheath to the mount by way of the attachment points, wherein: the backing plate is configured so that, when the sheath is in a first orientation in relation to the mount, a first and a second of the attachment points in the backing plate align with a respective first and second attachment point in the sheath; and the backing plate is further configured so that, when the sheath is in a second orientation in relation to the mount, a third and a fourth of the attachment points in the backing plate align with the respective first and second attachment points in the sheath.

In one embodiment, the backing plate is further configured so that, when the sheath is in a third orientation in relation to the mount, a fifth and a sixth attachment point in the backing plate align with the respective first and second attachment points in the sheath. In another embodiment, the attachment points are holes configured to receive the fasteners. In another embodiment, the second orientation is angularly offset from the first orientation by about 20 degrees; and the third orientation is angularly offset from the second orientation by about 20 degrees. In another embodiment, the first, third, and fifth attachment points in the backing plate are located at a first corner of the backing plate; and the second, fourth, and sixth attachment points in the backing plate are located at a second corner of the backing plate. In another embodiment, the backing plate is further configured so that, when the sheath is in a forth orientation in relation to the mount, the first and second attachment points in the backing plate align with a respective third and fourth attachment point in the sheath. In another embodiment, the fourth orientation is offset from the first orientation by about 90 degrees.

In another embodiment, the backing plate is further configured so that: when the sheath is in the first orientation in relation to the mount, a seventh and an eighth of the attachment points in the backing plate align with a respective third and fourth attachment point in the sheath; when the sheath is in the second orientation in relation to the mount, a ninth and a tenth attachment point in the backing plate align with the respective third and fourth attachment points in the sheath; when the sheath is in the third orientation in relation to the mount, an eleventh and a twelfth attachment point in the backing plate align with the respective third and fourth attachment points in the sheath; the seventh, ninth, and eleventh attachment points in the backing plate are located at a third corner of the backing plate; and the eighth, tenth, and twelfth attachment points in the backing plate are located at a fourth corner of the backing plate. In another embodiment, the retaining member is a plate having a substantially rectangular shape.

In another aspect, the disclosed technology relates to a mount for supporting a knife sheath from a waist belt, including: a backing plate having a plurality of attachment points formed therein; a belt restraint member configured for mounting on the backing plate and defining an opening configured to receive the waist belt; and a plurality of fasteners configured to secure the sheath to the mount by way of the attachment points, wherein: the backing plate is configured so that, when the sheath is in a first orientation in relation to the mount, a first and a second of the attachment points in the backing plate align with a respective first and second attachment point in the sheath; and the backing plate is further configured so that, when the sheath is in a second orientation in relation to the mount, a third and a fourth attachment point in the backing plate align with the respective first and second attachment points in the sheath.

In one embodiment, the backing plate is further configured so that, when the sheath is in a third orientation in relation to the mount, a fifth and a sixth attachment point in the backing plate align with the respective first and second attachment points in the sheath. In another embodiment, the attachment points are holes configured to receive the fasteners. In another embodiment, the second orientation is angularly offset from the first orientation by about 20 degrees; and the third orientation is angularly offset from the second orientation by about 20 degrees. In another embodiment, the first, third, and fifth attachment points in the backing plate are located at a first corner of the backing plate; and the second, fourth, and sixth attachment points in the backing plate are located at a second corner of the backing plate. In another embodiment, the backing plate is further configured so that, when the sheath is in a forth orientation in relation to the mount, the first and second attachment points in the backing plate align with a respective third and fourth attachment point in the sheath. In another embodiment, the fourth orientation is offset from the first orientation by about 90 degrees.

In another embodiment, the backing plate is further configured so that: when the sheath is in the first orientation in relation to the mount, a seventh and an eighth of the attachment points in the backing plate align with a respective third and fourth attachment point in the sheath, and the seventh and eighth attachment points in the backing plate and the third and fourth attachment points in the sheath can receive a respective third and fourth of the fasteners; when the sheath is in the second orientation in relation to the mount, a ninth and a tenth attachment point in the backing plate align with the respective third and fourth attachment points in the sheath; when the sheath is in the third orientation in relation to the mount, an eleventh and a twelfth attachment point in the backing plate align with the respective third and fourth attachment points in the sheath; the seventh, ninth, and eleventh attachment points in the backing plate are located at a third corner of the backing plate; and the eighth, tenth, and twelfth attachment points in the backing plate are located at a fourth corner of the backing plate. In another embodiment, the belt restraint includes a base, and a cover attached to the base; and the cover has a first and a second side portion attached to the plate, and a top portion attached to the first and second side portions.

In another aspect, the disclosed technology relates to a kit for suspending a knife sheath from a strap or a waist belt, including: a backing plate having an opening formed therein; a retaining member configured for mounting on the backing plate so that the retaining member spans a portion of the opening and the strap can engage the retaining member by way of the opening; and a belt restraint configured to be mounted on the backing plate in place of the retaining member, the belt restraint defining an opening configured to receive the waist belt. In one embodiment, the kit further includes a plurality of fasteners configured to secure the sheath to the mount; the backing plate has a plurality of attachment points formed therein; the backing plate is configured so that, when the sheath is in first orientation in relation to the backing plate, a first and a second of the attachment points in the backing plate align with a respective first and second attachment point in the sheath; and the backing plate is further configured so that, when the sheath is in a second orientation in relation to the backing plate, a third and a fourth of the attachment points in the backing plate align with the respective first and second attachment points in the sheath.

BRIEF DESCRIPTION OF THE DRAWINGS

The following drawings are illustrative of particular embodiments of the present disclosure and do not limit the scope of the present disclosure. The drawings are not to scale and are intended for use in conjunction with the explanations in the following detailed description. Various non-limiting embodiments will be described in detail with reference to the drawings, wherein like reference numerals represent like parts and assemblies throughout the several views.

DETAILED DESCRIPTION

Figure 1:
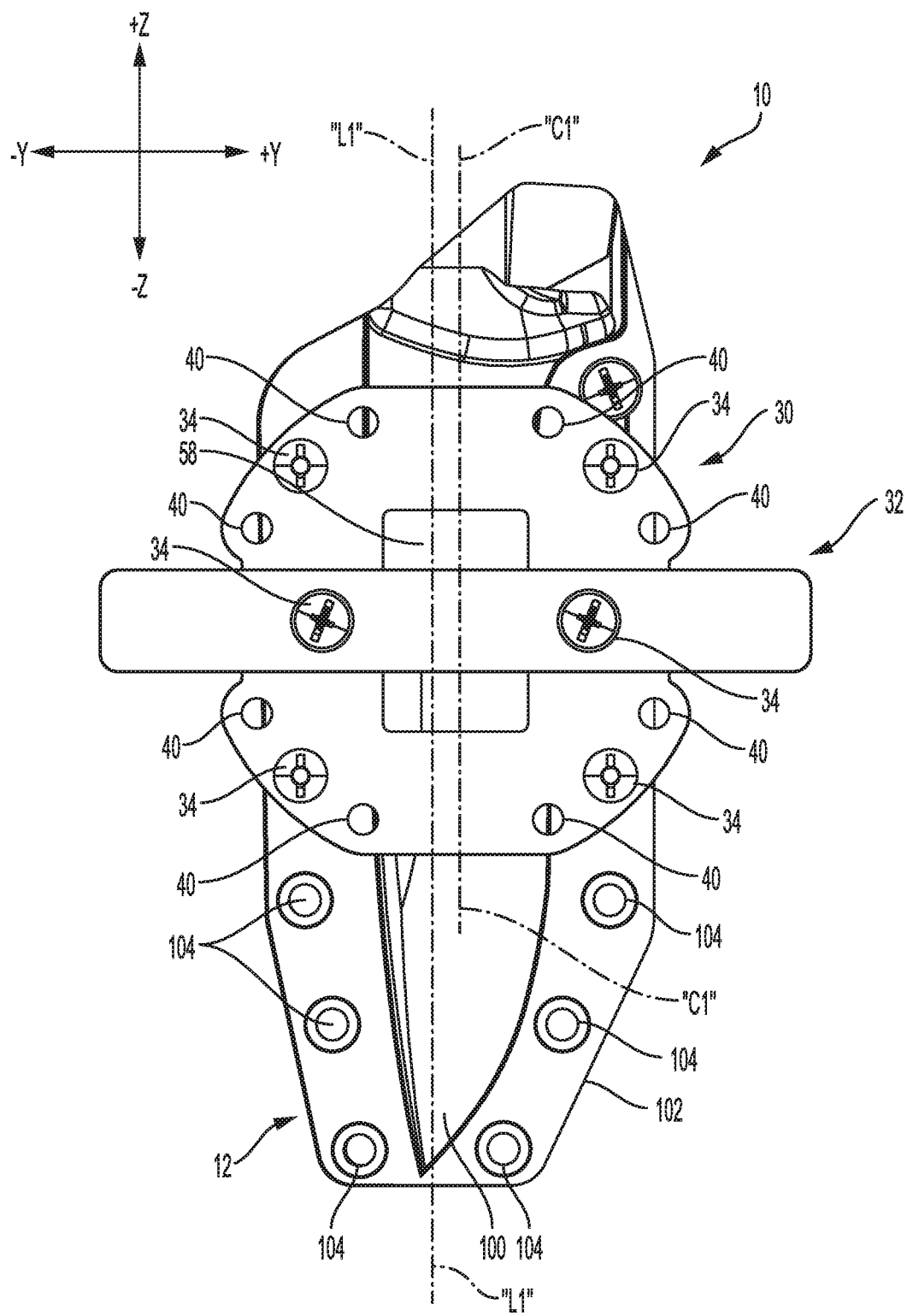
FIG. 1 is a side view of a knife sheath and a mount for the sheath, showing the sheath in a first (vertical) orientation in relation to the mount.

FIGS. 1-12 depict a mount 10 for a knife sheath 12. The mount 10 and the sheath 12 form a system for carrying a knife. The strap 18 can be, for example, a one-inch wide MOLLE strap suitable for being secured to MOLLE webbing 19 as used by armed forces, such as the U.S. military, and civilians. The strap 18 is shown in part in FIGS. 11 and 12. The webbing 19 is depicted in FIG. 13, and can be located, for example, on a vest, backpack, rucksack, etc. The use of the mount 10 to secure the sheath 12 to the MOLLE webbing 19 using the MOLLE strap 18 is disclosed for illustrative purposes only; the mount 10 can be used in other types of mounting arrangements involving the use of a strap or similar attachment means.

Referring to FIGS. 1-5, the sheath 12 comprises a body 100, and an adjoining edge portion 102. The body 100 defines a pocket that receives a blade of a knife (not shown). The edge portion 102 has a plurality of attachment points in the form of holes 104 formed therein. As discussed below, the holes 104 receive fasteners 34 that secure the sheath 12 to the mount 10. The sheath 12 can be formed from KYDEX® (a thermoplastic acrylic-polyvinyl chloride material), BOLTARON® (a thermoplastic alloy), other types of materials, and combinations thereof.

Referring to FIGS. 6-12, the mount 10 is an assembly comprising a backing plate 30, a retaining member 32, and fasteners 34. The retaining member 32 is removably (i.e., non-permanently) attached to a first or rearward side of the backing plate 30 via the fasteners 34. The fasteners 34 can be, for example, sex bolts (also referred to as Chicago Screws or Sex Screws) each having an internally threaded nut or barrel 36, an externally-threaded screw 38 that engages the nut 36; and a washer 39. See FIG. 10. Other types of fasteners, such as screws, nuts and bolts, rivets, clamps, latches, and the like can be used in the alternative.

Figure 8:
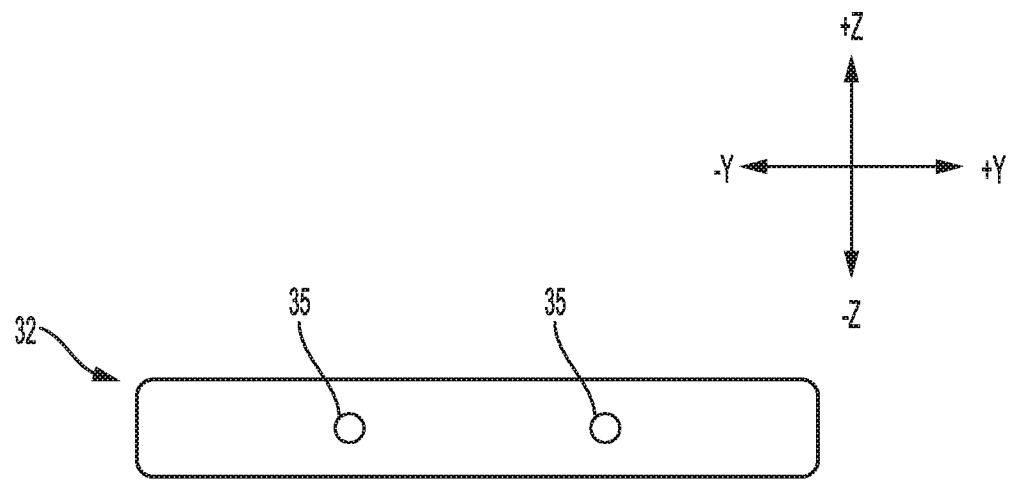
FIG. 8 is a side view of a retaining member of the mount shown in FIGS. 1-5.
Figure 9:
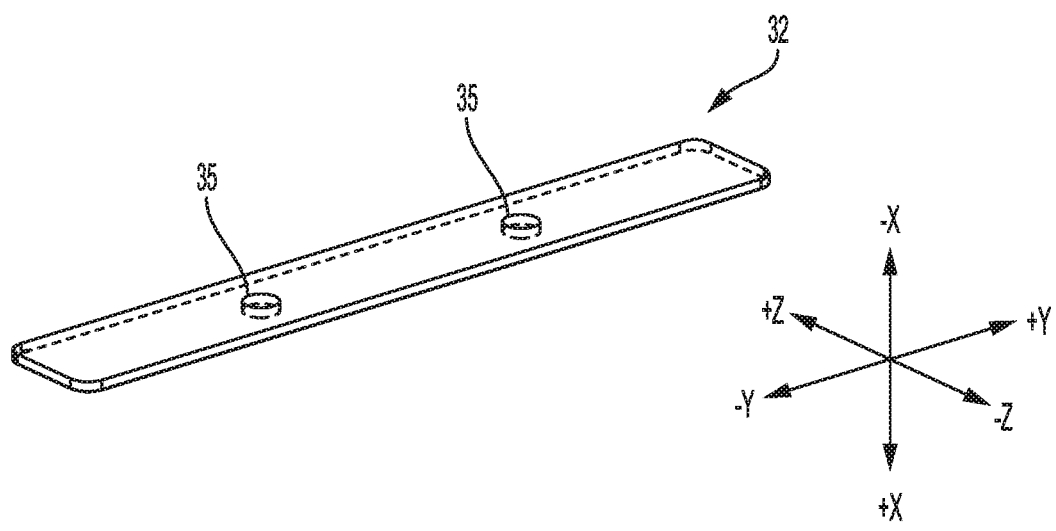
FIG. 9 is a top-side perspective view of the retaining member shown in FIG. 8.
Figure 10:
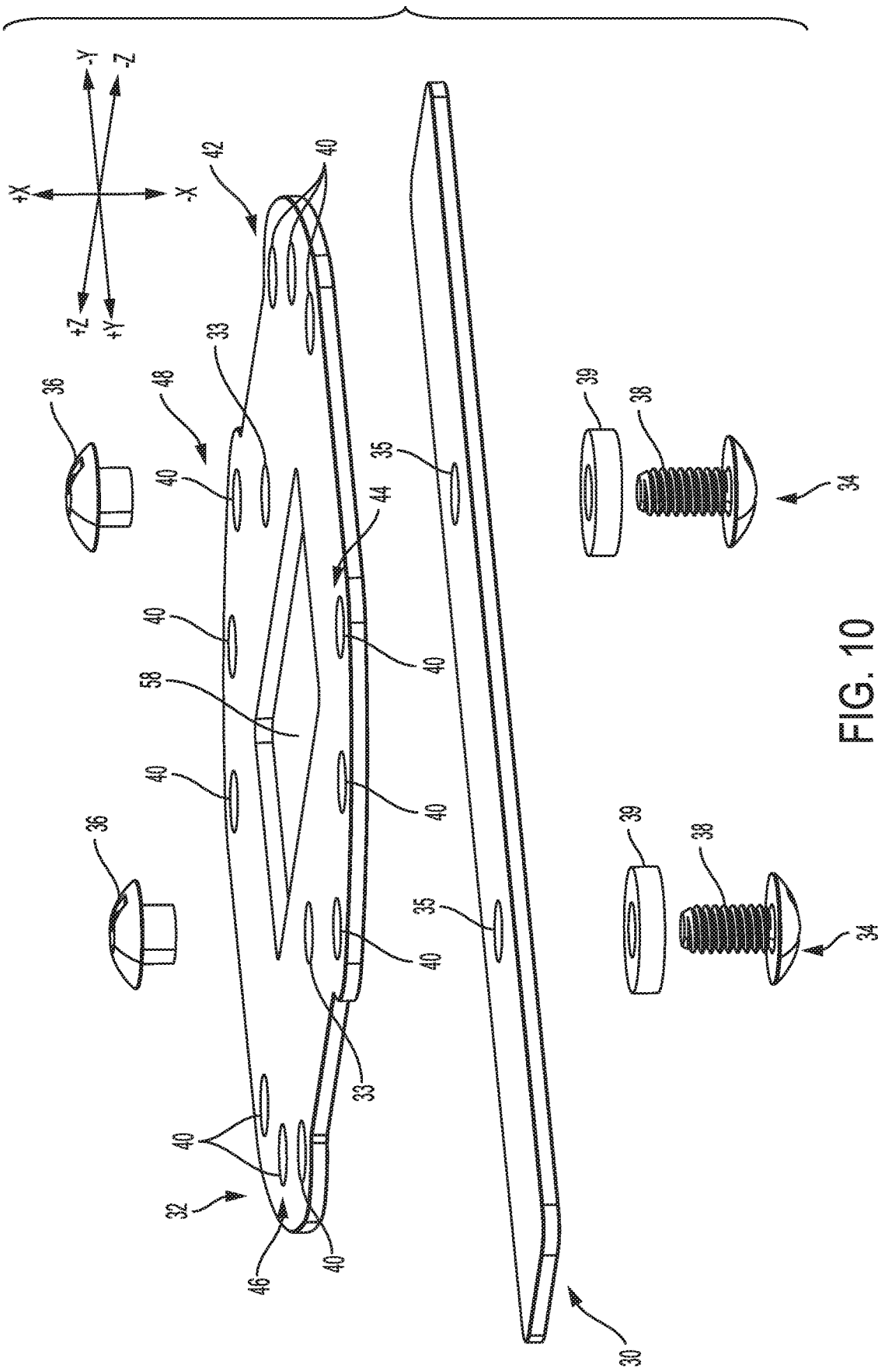
FIG. 10 is an exploded perspective view of the backing plate and retaining member shown in FIGS. 6-9.

As shown in FIGS. 8 and 9, the retaining member 32 can be configured as a thin plate having a generally rectangular shape. The retaining member 32 may have two attachment points in the form of holes 35 formed therein to accommodate the fasteners 34. The retaining member 32 can have a length of about 3 inches to about 6 inches; a width of about 0.38 inch to about 1.0 inch; and a thickness of about 0.03 inch to about 0.07 inch. These exemplary dimensions are presented for illustrative purposes only. The retaining member 32 may have other dimensions in alternative embodiments. Also, the retaining member 32 may have a shape other than rectangular in alternative embodiments.

Figure 6:
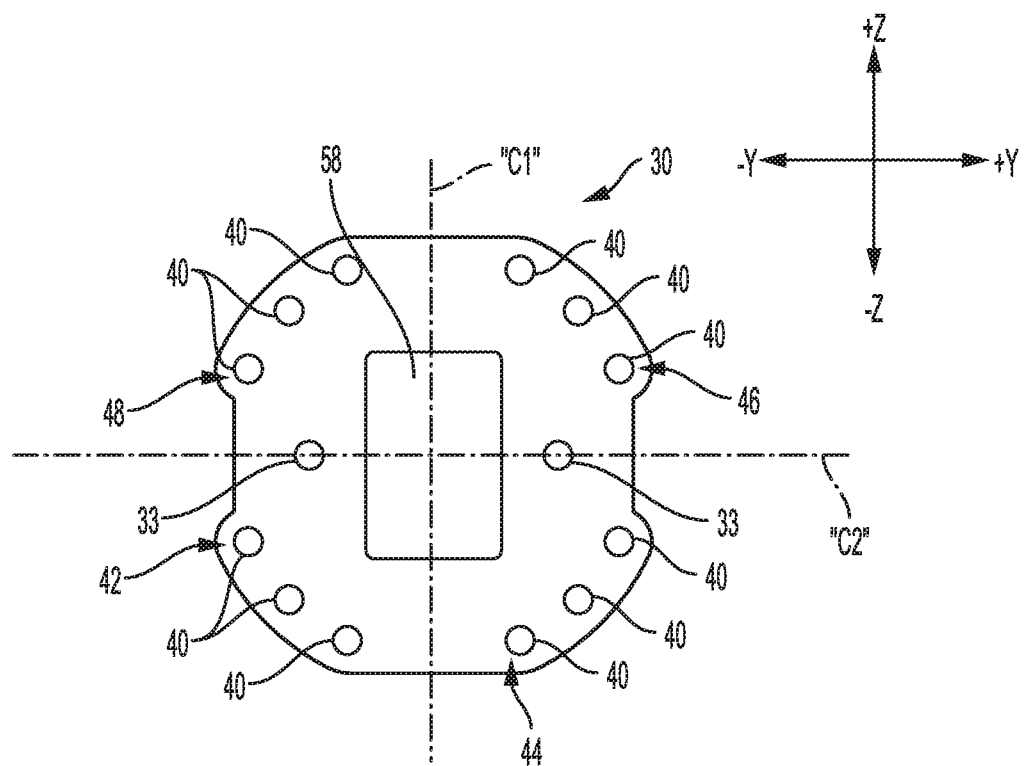
FIG. 6 is a side view of a backing plate of the mount shown in FIGS. 1-5.
Figure 7:
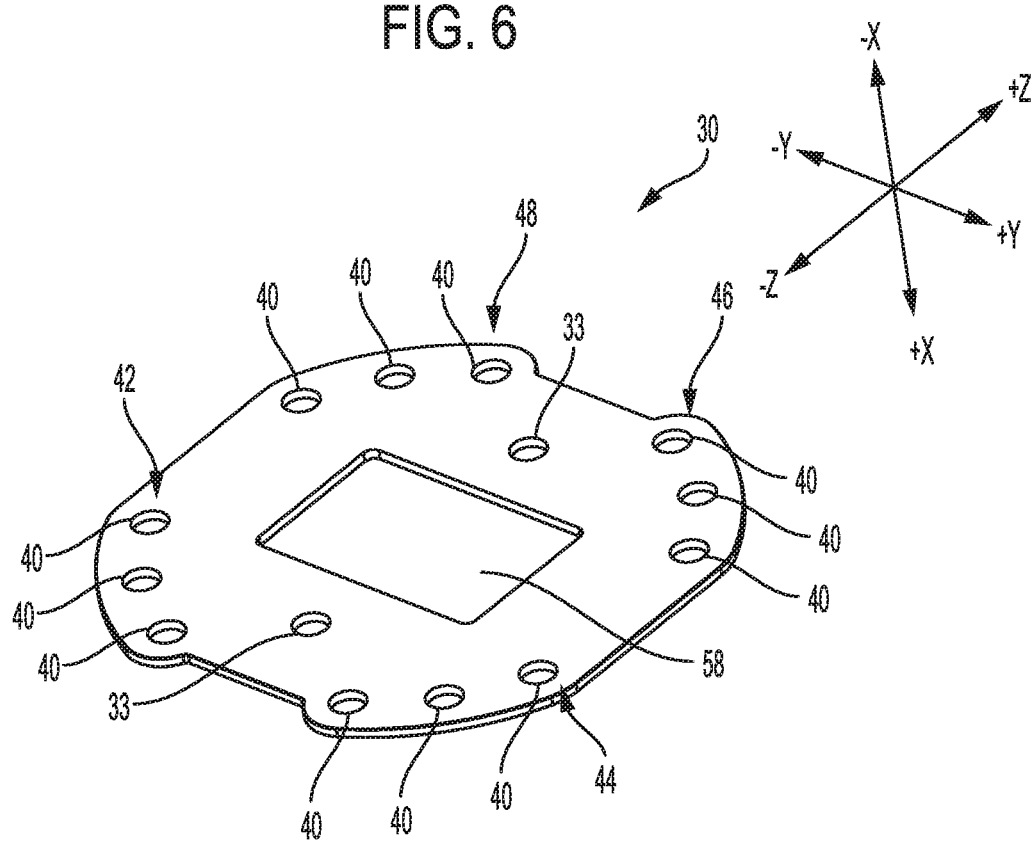
FIG. 7 is a top-side perspective view of the backing plate shown in FIG. 6.

The backing plate 30 can be configured as a thin plate having the shape depicted in FIGS. 6 and 7. The backing plate 30 can have other shapes in alternative embodiments. The backing plate 30 has a centrally-located, generally rectangular opening 58 formed therein. The backing plate 30 may also have two attachment points in the form of holes 33 formed therein and located on opposite sides of the opening 58. The holes 33 in the backing plate 30 align with the holes 35 in the retaining member 32, and along with the holes 35 receive the fasteners 34 that removably attach the retaining member 32 to the backing plate 30.

Figure 11:
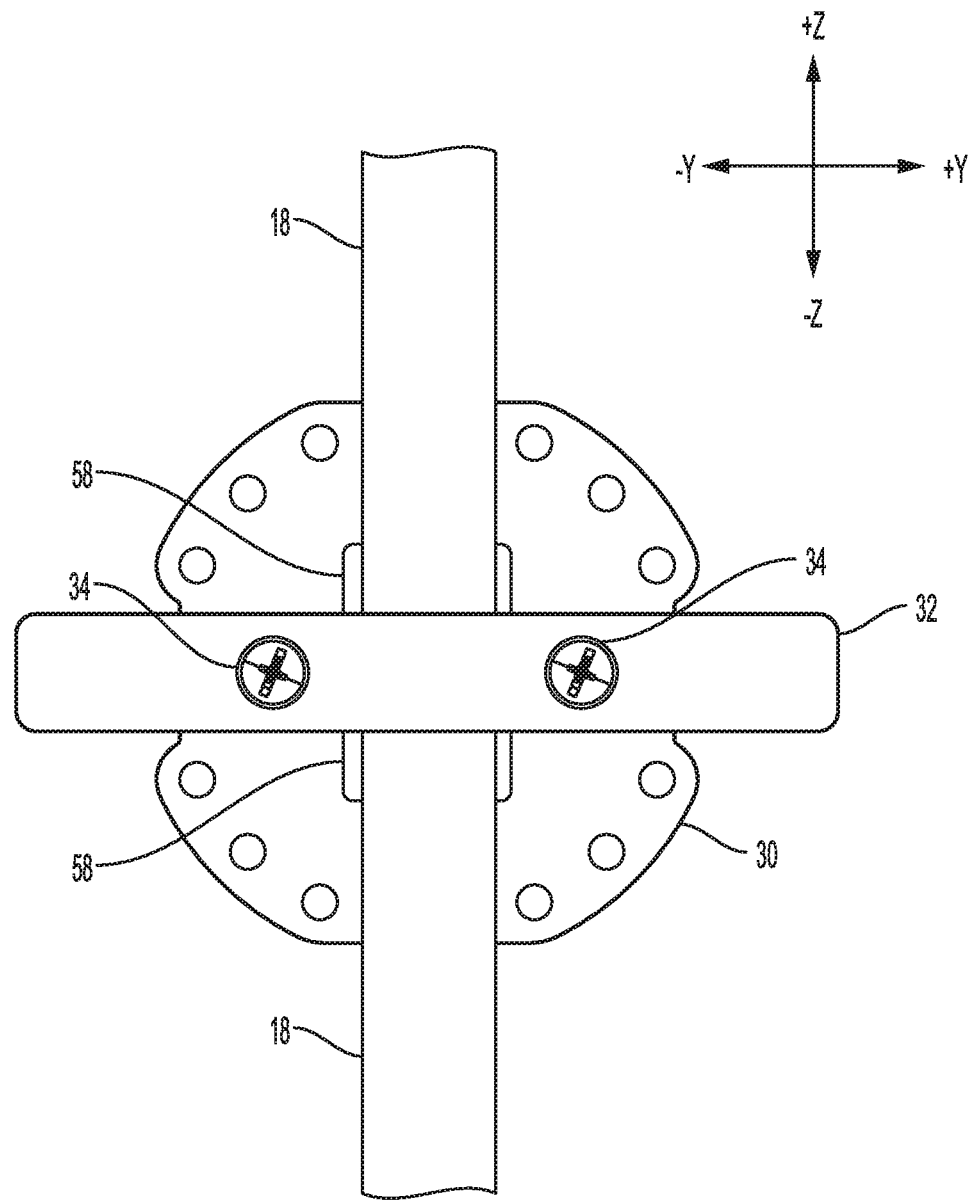
FIG. 11 is a side view of the backing plate and retaining member shown in FIGS. 6-10 engaging a strap.
Figure 12:
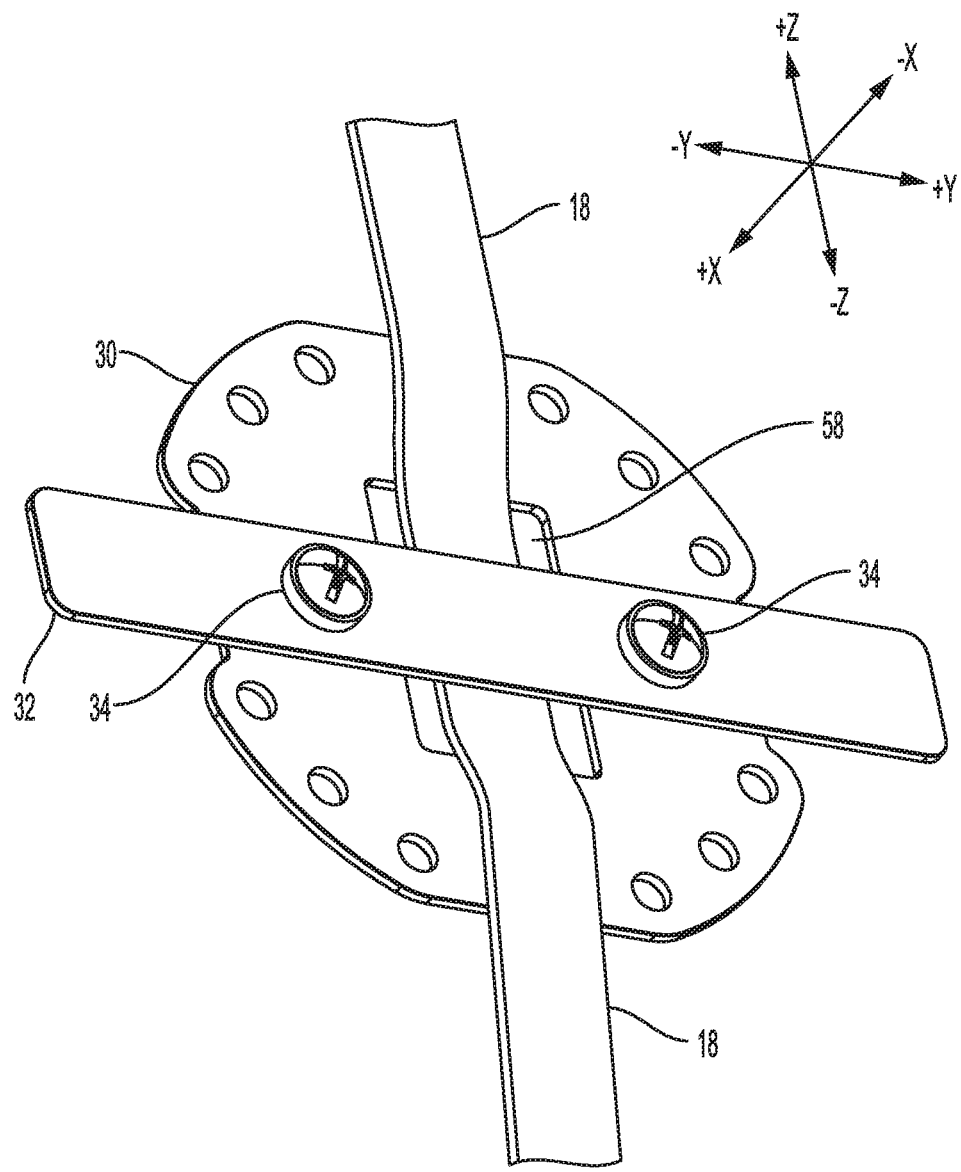
FIG. 12 is a bottom-side perspective view of the backing plate and retaining member shown in FIGS. 6-10 engaging the strap shown in FIG. 11.
Figure 13:
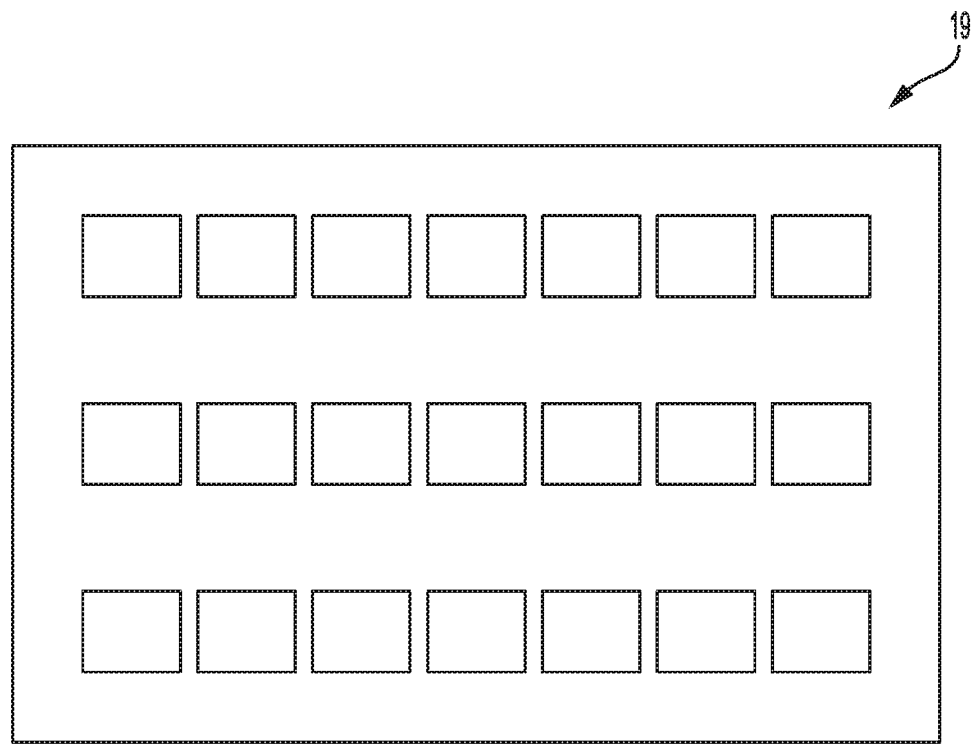
FIG. 13 is a side view of webbing configured to retain the strap shown in FIGS. 11 and 12.
Figure 14:
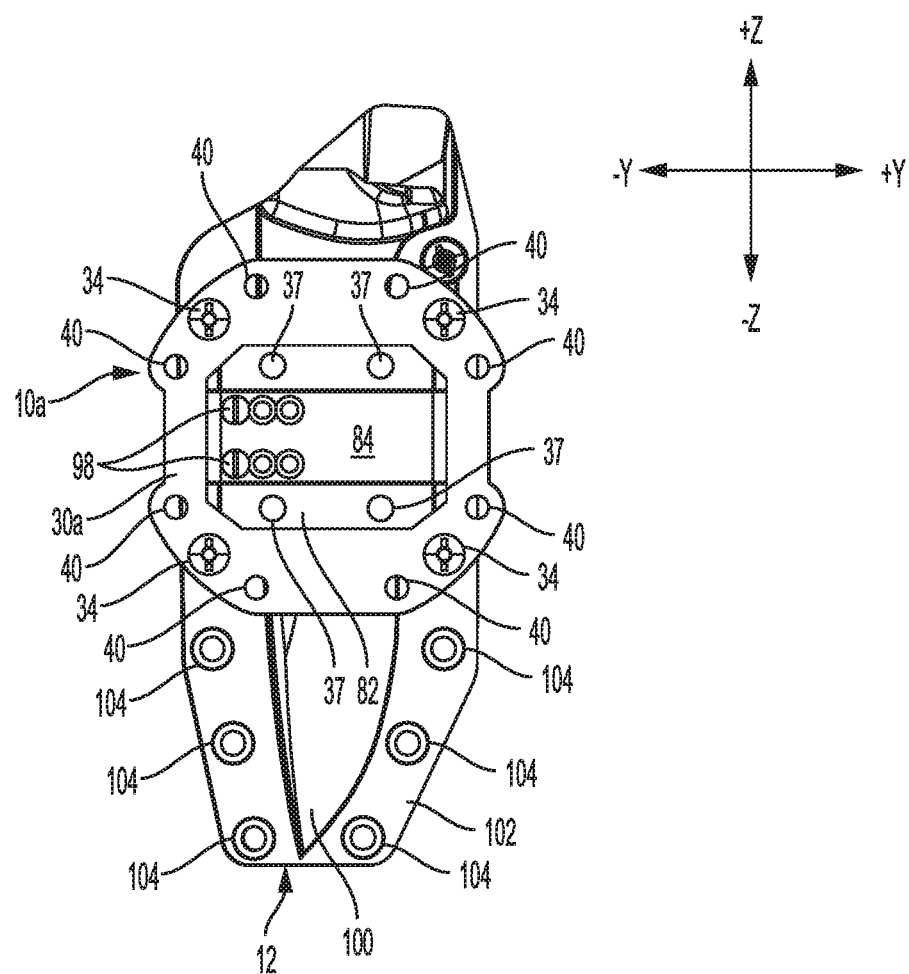
FIG. 14 is a side view of the sheath shown in FIGS. 1-5, and an alternative embodiment of the mount shown in FIGS. 1-12, showing the sheath in a first (vertical) orientation in relation to the mount.
Figure 15:
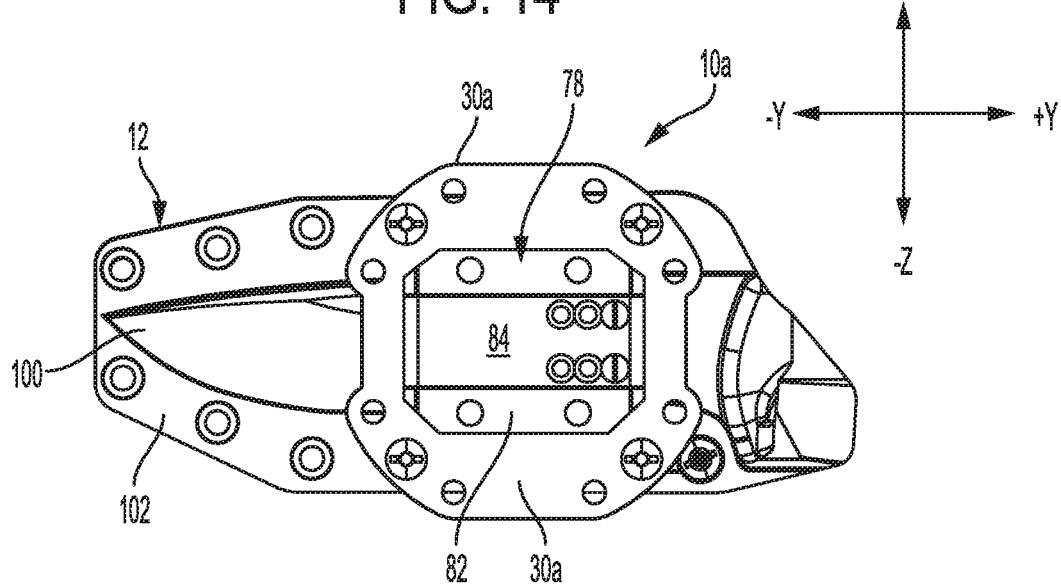
FIG. 15 is a side view of the sheath shown in FIGS. 1-5 and 14, and the mount shown in FIG. 14, showing the sheath in a second (horizontal) orientation in relation to the mount.
Figure 16:
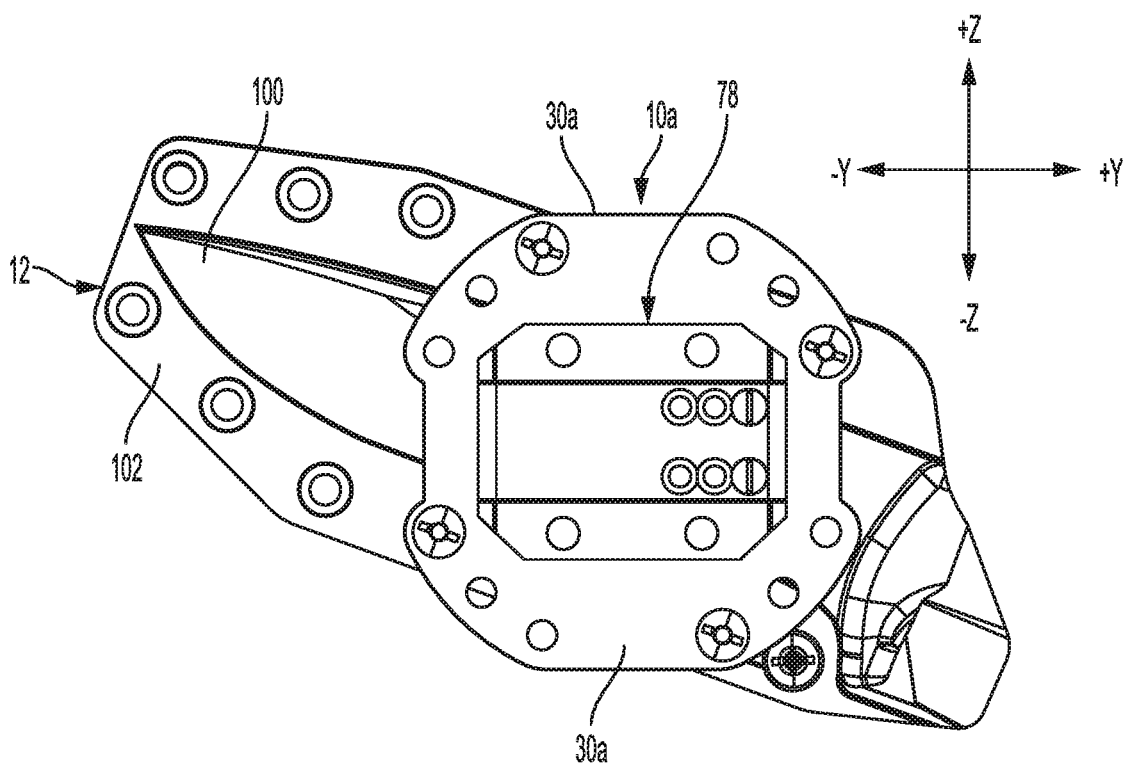
FIG. 16 is a side view of the sheath shown in FIGS. 1-5, 14, and 15, and the mount shown in FIGS. 14 and 15, showing the sheath in a third orientation in relation to the mount.
Figure 17:
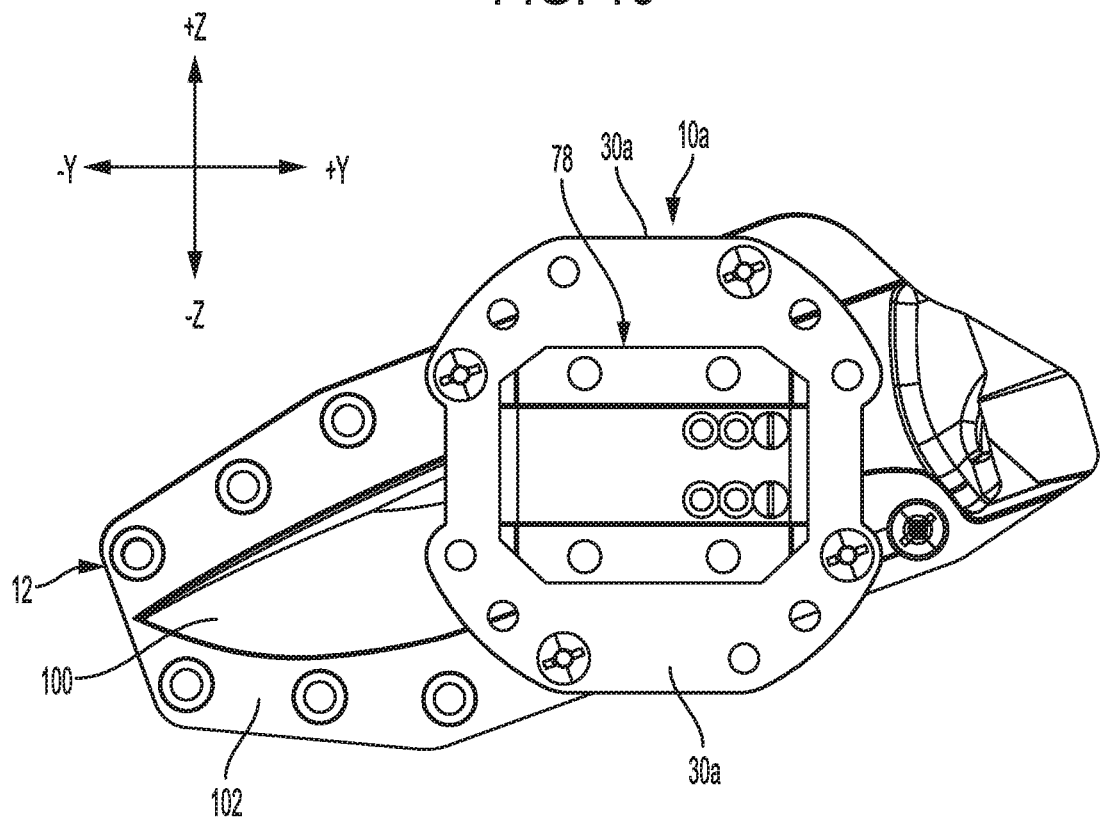
FIG. 17 is a side view of the sheath shown in FIGS. 1-5 and 14-16, and the mount shown in FIGS. 14-16, showing the sheath in a fourth orientation in relation to the mount.
Figure 18:
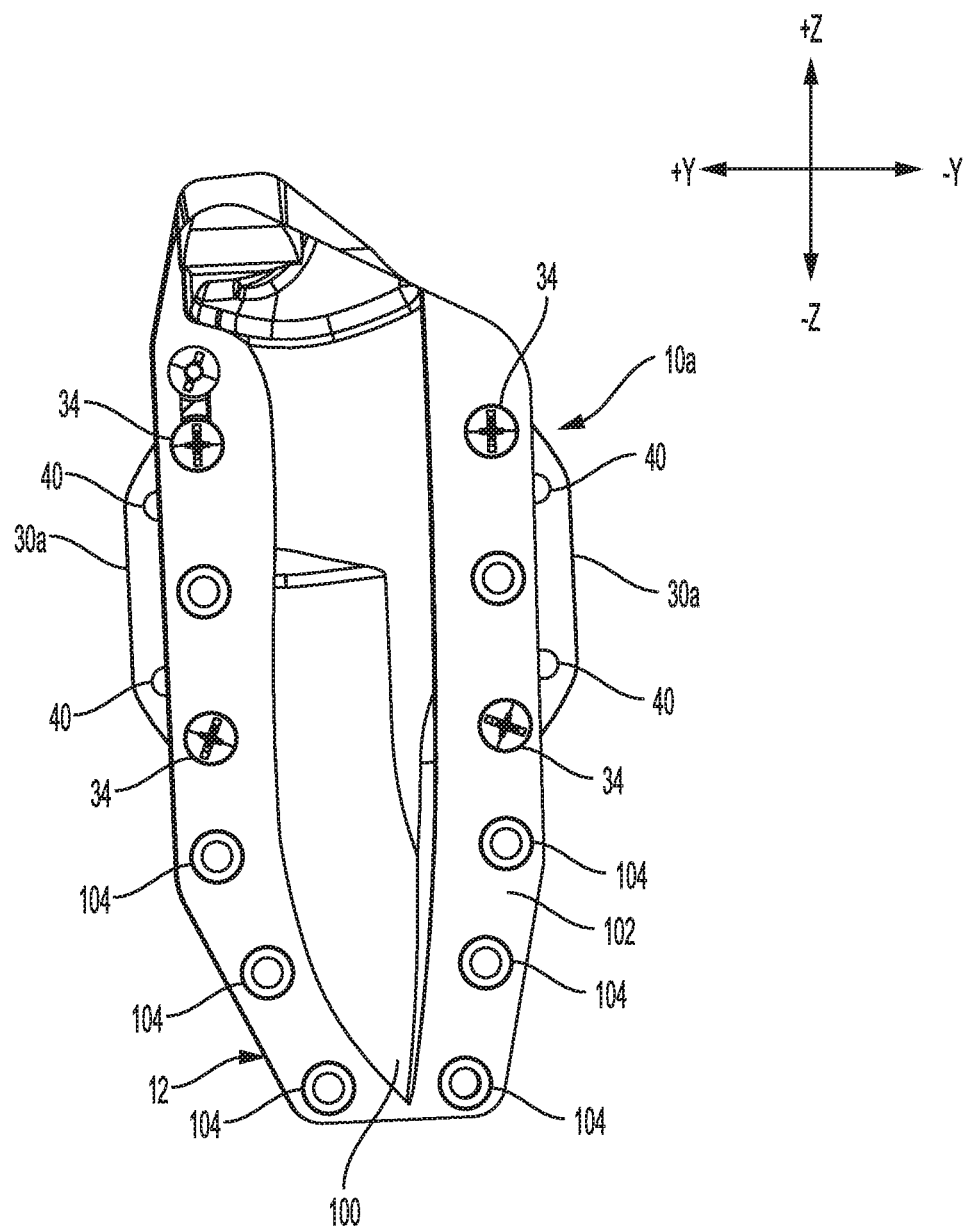
FIG. 18 is a side view of the sheath shown in FIGS. 1-5 and 14-17, and the mount shown in FIGS. 14-17, showing the opposite sides of the sheath and mount from those shown in FIGS. 14-17, and depicting the sheath in the first orientation.

As shown in FIGS. 11 and 12, the retaining member 30 spans the shorter dimension of the generally rectangular opening 58, and extends beyond the outer edges of the backing plate 30. The retaining member 30 can be shorter in alternative embodiments, so that the retaining member 32 does not extend beyond the outer edges of the backing plate 30. Also, the opening 58 can have a shape other than rectangular in alternative embodiments. As discussed below, the opening 58 receives the strap 18, and the engagement of the strap 18 and the retaining member 32 secures the mount 10, and the attached sheath 12, to the webbing panel 19.

The width, or "y" dimension of the opening 58 can be about 1.38 inches to about 1.75 inches, to accommodate the standard one-inch width of a MOLLE strap. The length, or "x" dimension of the opening 58 can be about 0.9 inch to about 1.13 inch. The maximum length of the backing plate 30 can be about 2.5 inches to about 4.5 inches. The maximum width of the backing plate 30 can be about 2.5 inches to about 4.5 inches. These dimensions are presented for illustrative purposes only; the opening 58 and the backing plate 30 can have other dimensions in alternative embodiments.

The backing plate 30 has twelve attachment points in the form of holes 40 formed therein, as shown in FIGS. 6 and 7. The holes 40 receive additional fasteners 34 that secure the sheath 12 to a second, or front side of the backing plate 30. The holes 40 are arranged in four sets of three. Specifically, three of the holes 40 are positioned in close proximity to each other to from a first set 42 of holes 40. Another three of the holes 40 are positioned in close proximity to each other to form a second set 44 of holes 40. Three more of the holes 40 are positioned in close proximity to each other to form a third set 46; and the remaining three holes 40 are positioned in close proximity to each other to form a fourth set 48. The three holes 40 in each of the first, second, third, and fourth sets 42, 44, 46, 48 are arranged along respective arcs, and are angularly spaced along their respective arcs by about 20 degrees.

The holes 40 are located proximate an outer edge of the backing plate 30. The first set 42, second set 44, third set 46, and fourth set 48 of holes 40 are located at or near respective corners of the backing plate 30, and are symmetrically disposed about the geometric centerlines "$C_1$" and "$C_2$" of the backing plate 30, as shown in FIG. 6.

The holes 40 in the backing plate 30 are configured so that the sheath 12 can be secured to the backing plate 30 in three different orientations. In a first of the orientations, shown in FIGS. 1 and 5, the centerline $C_1$ of the backing plate 30 is approximately parallel to the lengthwise direction "$L_1$" of the sheath 12, i.e., to the general direction in which a knife is inserted into and removed from the sheath 12. When the sheath 12 and backing plate 30 are oriented in this manner, the center hole 40 in each of the first, second, third, and fourth sets 42, 44, 46, 48 aligns with a corresponding hole 104 in the sheath 12, and each pair of aligned center holes 40 and holes 104 receives a corresponding one of the fasteners 34, to secure the sheath 12 to the backing plate 30 in the first orientation.

Figure 2:
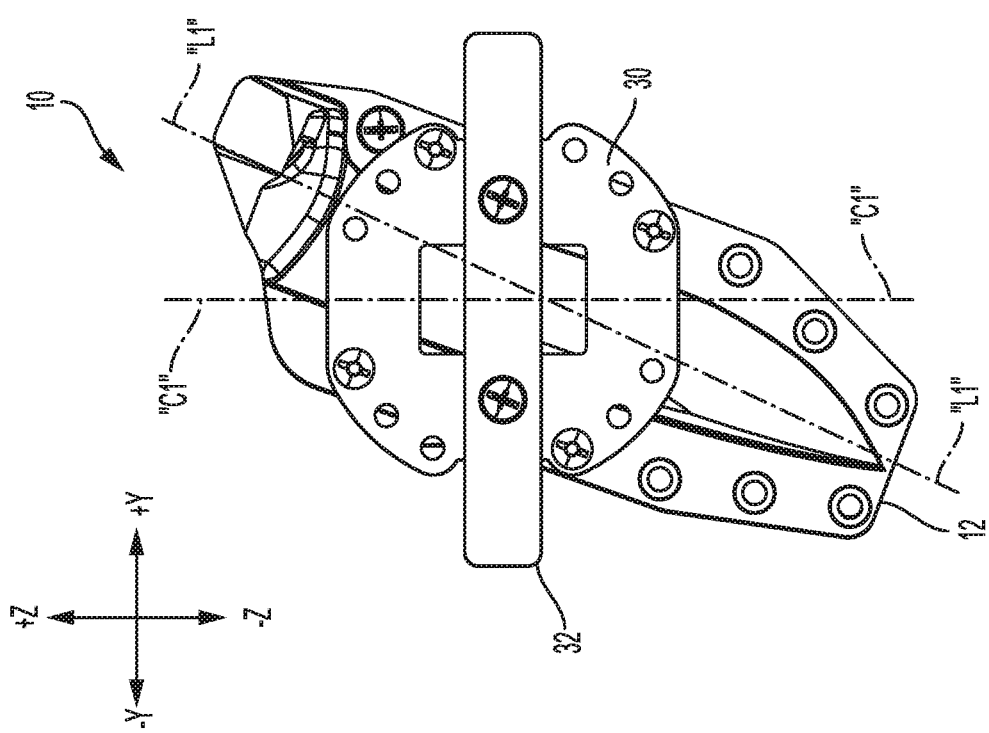
FIG. 2 is a side view of the sheath and mount shown in FIG. 1, showing the sheath in a second orientation in relation to the mount.

The sheath 12 can be attached to the backing plate 30 in a second orientation shown in FIG. 2. When the sheath 12 and the backing plate 30 are oriented in this manner, the lengthwise direction $L_1$ of the sheath 12 is offset from the centerline "$C_1$" of the backing plate 30 by an angle of about +20 degrees (i.e., about 20 degrees clockwise) from the perspective of FIG. 2; and a first of the outer holes 40 in each of the first, second, third, and fourth sets 42, 44, 46, 48 aligns with a corresponding hole 104 in the sheath 12; with the corresponding holes 104 in the sheath 12 being the same holes 104 that align with the center holes 40 in the backing plate 30 when the backing plate 30 is in its first orientation. Each pair of aligned outer holes 40 and holes 104 receives a corresponding one of the fasteners 34, to secure the sheath 12 to the backing plate 30 in the second orientation.

Figure 3:
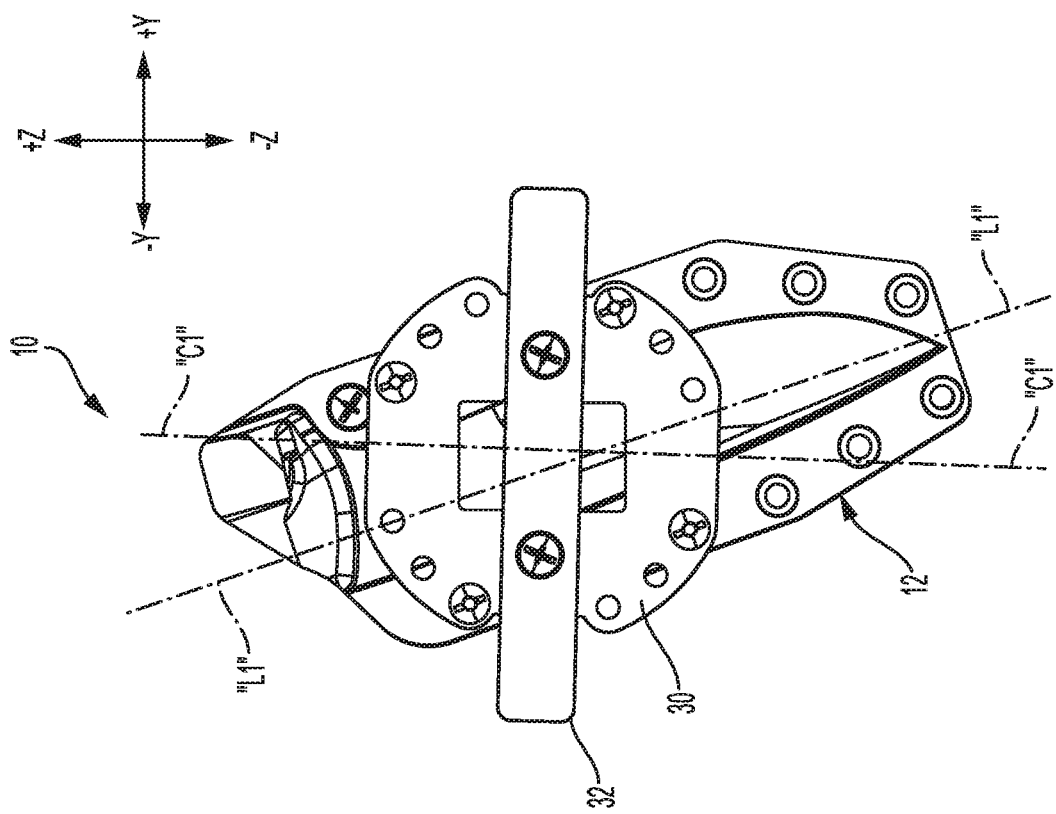
FIG. 3 is a side view of the sheath and mount shown in FIGS. 1 and 2, showing the sheath in a third orientation in relation to the mount.

The sheath 12 can be attached to the backing plate 30 in a third orientation shown in FIG. 3. When the sheath 12 and the backing plate 30 are oriented in this manner, the lengthwise direction L₁ of the sheath 12 is offset from the centerline C₁ of the backing plate 30 by an angle of about −20 degrees (i.e., about 20 degrees counterclockwise); and a second of the outer holes 40 in each of the first, second, third, and fourth sets 42, 44, 46, 48 of holes 40 aligns with the corresponding hole 104 in the sheath 12; with the corresponding holes 104 in the sheath 12 being the same holes 104 that align with the other holes 40 in the backing plate 30 when the backing plate 30 is in its first and second orientations. Each pair of aligned outer holes 40 and holes 104 receives a corresponding one of the fasteners 34, to secure the sheath 12 to the backing plate 30 in the third orientation.

Figure 4:
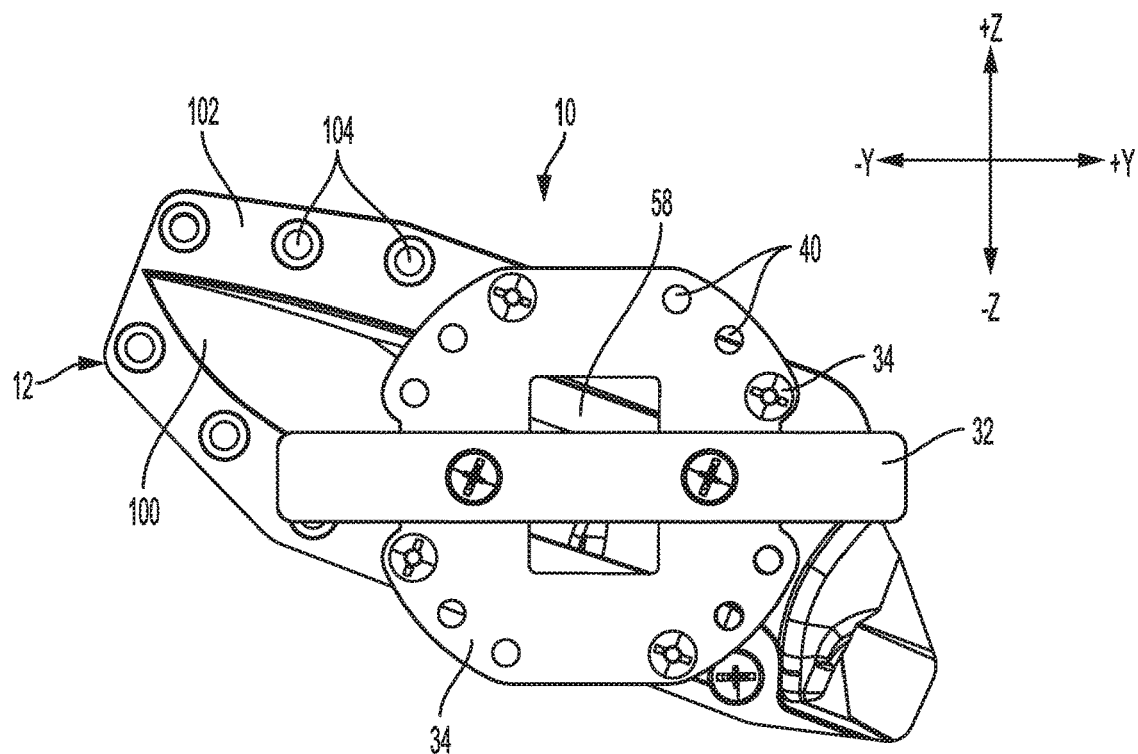
FIG. 4 is a side view of the sheath and mount shown in FIGS. 1-3, showing the mount in an orientation offset by about 90 degrees from the orientation shown in FIGS. 1-3, and depicting the sheath in a fourth orientation in relation to the mount.
Figure 5:
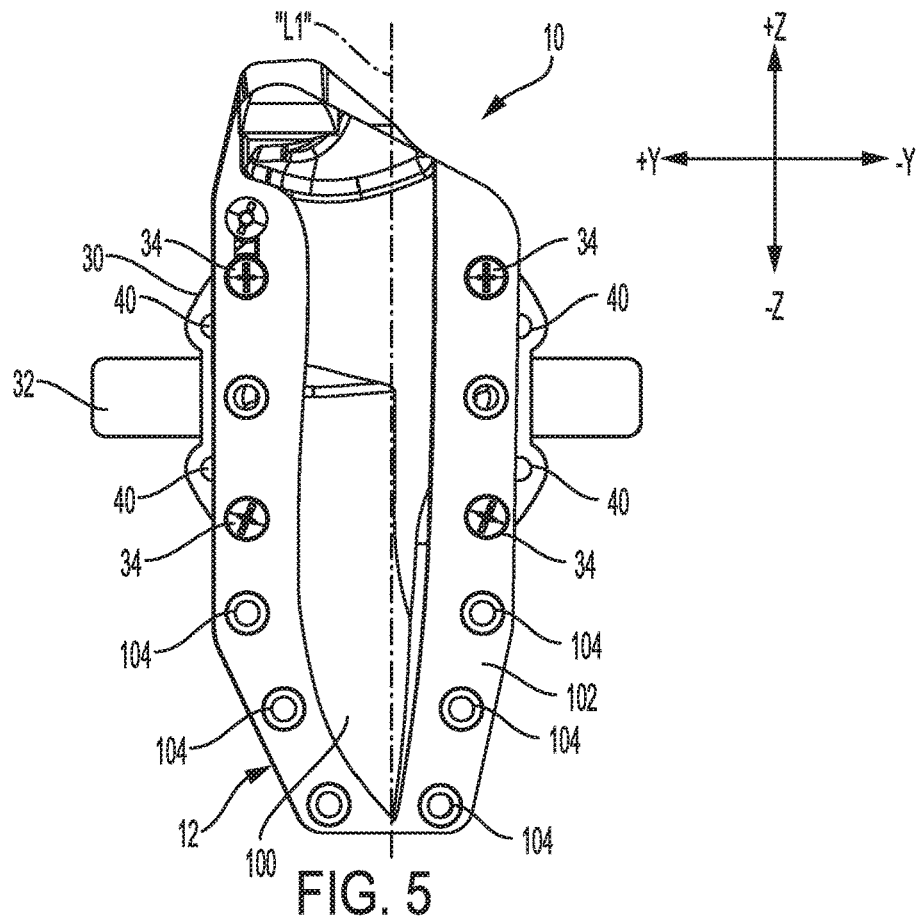
FIG. 5 is a side view of the sheath and mount shown in FIGS. 1-4, showing the opposite sides of the sheath and mount from those shown in FIGS. 1-4, and depicting the sheath in the first orientation.

FIGS. 1-3 and 5 depict the sheath 12 is a generally vertical, or near vertical orientation. Because the first, second, third, and fourth sets 42, 44, 46, 48 of holes 40 are symmetrically disposed about the geometric centerlines "C1" and "C2" of the backing plate 30, the holes 40 will still line up with the above-referenced holes 104 in the sheath 12 when the backing plate 30 is rotated by about 90 degrees clockwise, about 90 degrees counterclockwise, and about 180 degrees from the positions shown in FIGS. 1-3 and 5, although each particular hole 104 will be associated with a different one of the first, second, third, and fourth sets 42, 44, 46, 48 of holes 40. Thus, the sheath 12 can also be mounted on the backing plate 30 in a generally horizontal, or near horizontal orientation, i.e., in orientations offset by about 90 degrees clockwise or about 90 degrees counterclockwise from the orientations shown in FIGS. 1-3 and 5. For example, FIG. 4 depicts the sheath 12 in an orientation offset from the horizontal by about 20 degrees in the clockwise direction. Also, the sheath 12 can be mounted on the backing plate 30 in an orientation offset by about 180 degrees from the orientations shown in FIGS. 1-3 and 5. Thus, the number and positioning of the holes 40 as described herein allows the sheath 12 to be positioned in twelve different orientations in relation to the backing plate 30.

The spacing between the holes 40 in each of the first, second, third, and fourth sets 42, 44, 46, 48 of holes 40 can be varied from that shown herein, to permit the orientation of the sheath 12 to be adjusted in increments other than about 20 degrees. For example, hole-to-hole spacings of about 10 degrees to about 30 degrees be used in alternative embodiments.

Also, additional holes 40 can be formed in the backing plate 30 in alternative embodiments, to allow the sheath 12 to be positioned in more than twelve different orientations. Conversely, the backing plate 30 can be formed with less than twelve holes in applications where it is not necessary or otherwise desirable to provide the user with the option to position the sheath in as many as twelve different orientations. For example, one possible alternative embodiment can have eight total holes 40, arranged in four sets of two holes 40, to allow eight possible orientations for the sheath 12. Another possible alternative embodiment can have 16 total holes 40, arranged in four sets of four holes 40, to allow 16 different orientations for the sheath 12.

Because the fasteners 34 are non-permanent, and can be mated and de-mated quickly and easily without special tooling, the user can readily change the orientation of the sheath 12 in relation to the backing plate 30 to suit the user's preference.

The mount 10 and the attached sheath 12 can be attached to the MOLLE webbing 19 as follows. One end of the strap 18 can be folded and threaded though one of the loops formed by the webbing 19 to secure that end of the strap 18 to the webbing 19. Referring to FIGS. 11 and 12, the other (free) end of the strap 18 is inserted in and through the opening 58, from the first (rearward) side of the backing plate 30. The free end is then fed between the retaining member 32 and the sheath 12, and is subsequently drawn through the opening 58 on the opposite side of the retaining member 32. Next, the free end is pulled to draw more of the strap 18 into the opening 58 around the retaining member 32, and back out of the opening 58 until substantially all of the slack has been removed from the strap 18. The portion of the strap 18 that has been drawn through the opening 58, which includes the free end of the strap 18, can then be folded and threaded through another one of the loops formed by the webbing 19 to secure that end of the strap 18 to the webbing 19.

As shown in FIGS. 11 and 12, the positioning of the strap 18 behind the retaining member 32 causes the strap 18 to hold the retaining member 32 captive, thereby securing the mount 10 and the attached sheath 12 to the piece of equipment, e.g., a vest or knapsack, on which the webbing 19 is mounted; and the orientation of the sheath 12 in relation to the mount 10 and the piece of equipment can be varied as discussed above. The mount 10 can be removed from the webbing 19 by removing one of the ends of the strap 18 from its respective loop in the webbing 19, and pulling the strap 18 to eventually draw the free end of the strap 18 in, through and back out of the opening 58.

FIGS. 1-3 and 5 depict the mount 10 in an orientation in which the retaining member 32 is generally horizontal, or near horizontal. This orientation is suitable for installing the mount 10 on a webbing panel 19 on which the strap 18 extends vertically, as depicted in FIGS. 11 and 12. As noted above, the mount 10 can be positioned in orientations offset by about 90 degrees from the orientations shown in FIGS. 1-3 and 5. The mount 10 can be positioned in such orientations when the mount 10 is mounted in an arrangement in which the strap 18 extends in a horizontal, or near horizontal direction.

FIGS. 14-25 illustrate an alternative embodiment in the form of a mount 10*a*. The mount 10*a* can be mounted on a waist belt, such as the waist belt 74 shown in part in FIGS. 24 and 25. The mount 10*a* and the sheath 12 form a system for carrying a knife.

Figure 19:
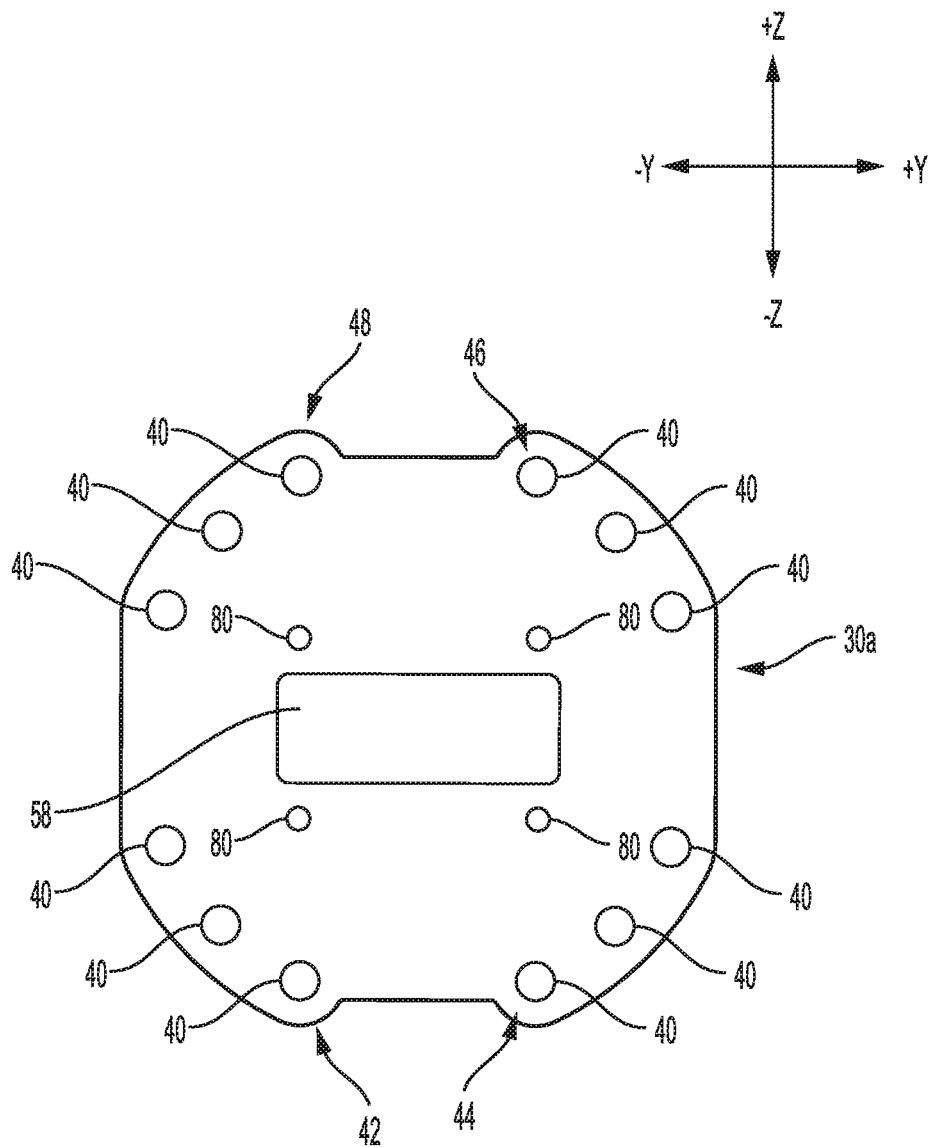
FIG. 19 is a side view of a backing plate of the mount shown in FIGS. 14-18.

Referring to FIGS. 19-23, the mount 10*a* includes a backing plate 30*a*, a belt restraint member 78, a belt spacer 79, and the above-referenced fasteners 34. The backing plate 30*a* can be identical to the backing plate 30, with the following exceptions. The backing plate 30*a* has four attachment points in the form of holes 80 formed therein to facilitate attachment of the belt restraint member 78 to the second, or front side of the backing plate 30*a*; and the backing plate 30*a* does not include the holes 33 of the backing plate 30 that facilitate attachment of the retaining member 32, as shown in FIG. 19. With these exceptions, the above description of the backing plate 30 applies equally to the backing plate 30*a*, including the ability of the backing plate 30 to hold the sheath 12 in a variety of different orientations, i.e., the backing plate 30*a* can hold the sheath 12 in twelve different orientations in the same manner as the backing plate 30.

Figure 20:
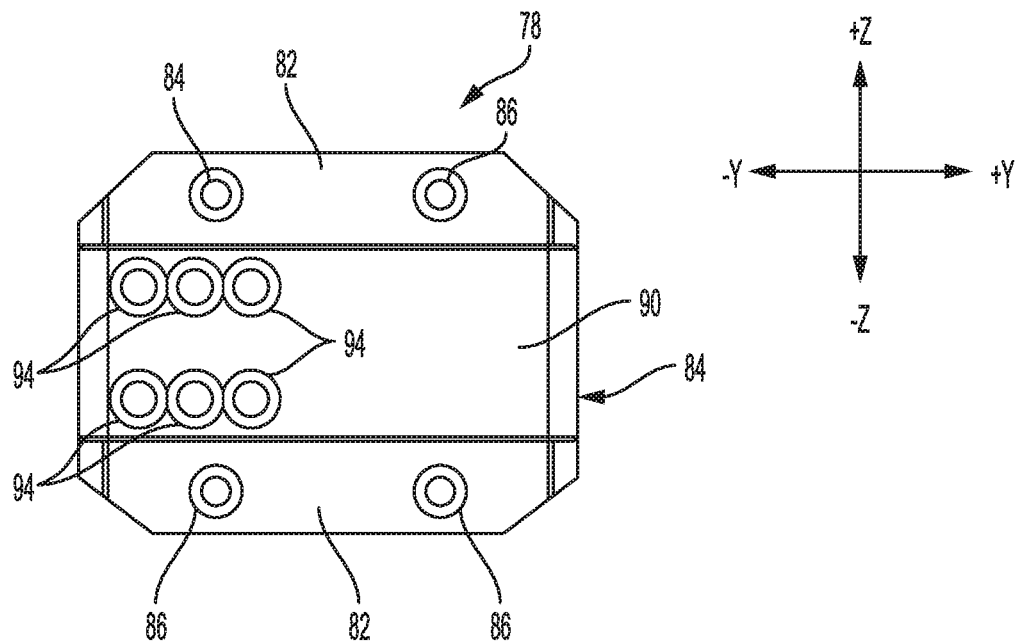
FIG. 20 is a side view of a belt restraint member of the mount shown in FIGS. 14-19.
Figure 21:
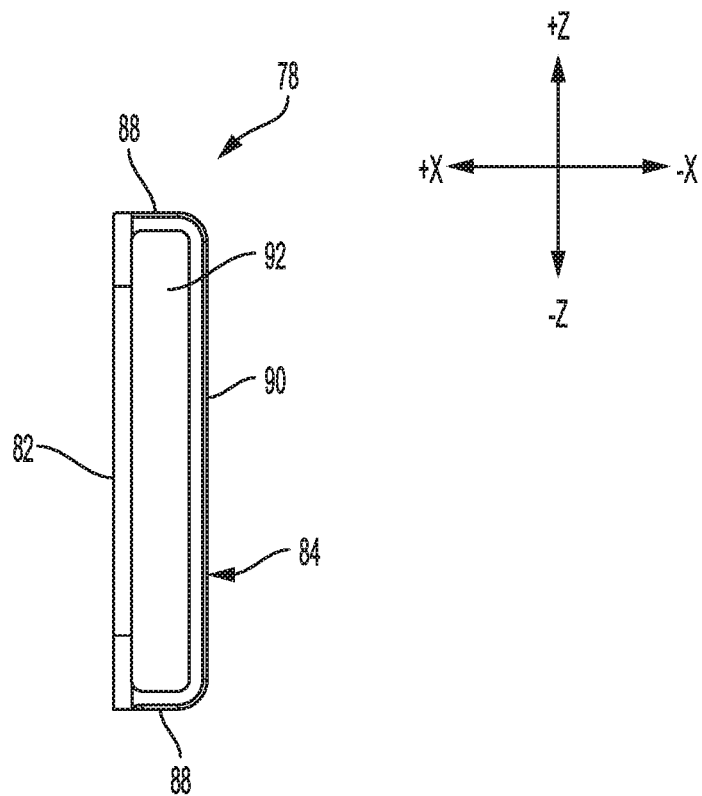
FIG. 21 side view of the belt restraint member shown in FIG. 20, from a perspective offset by about 90 degrees from the perspective of FIG. 20.
Figure 22:
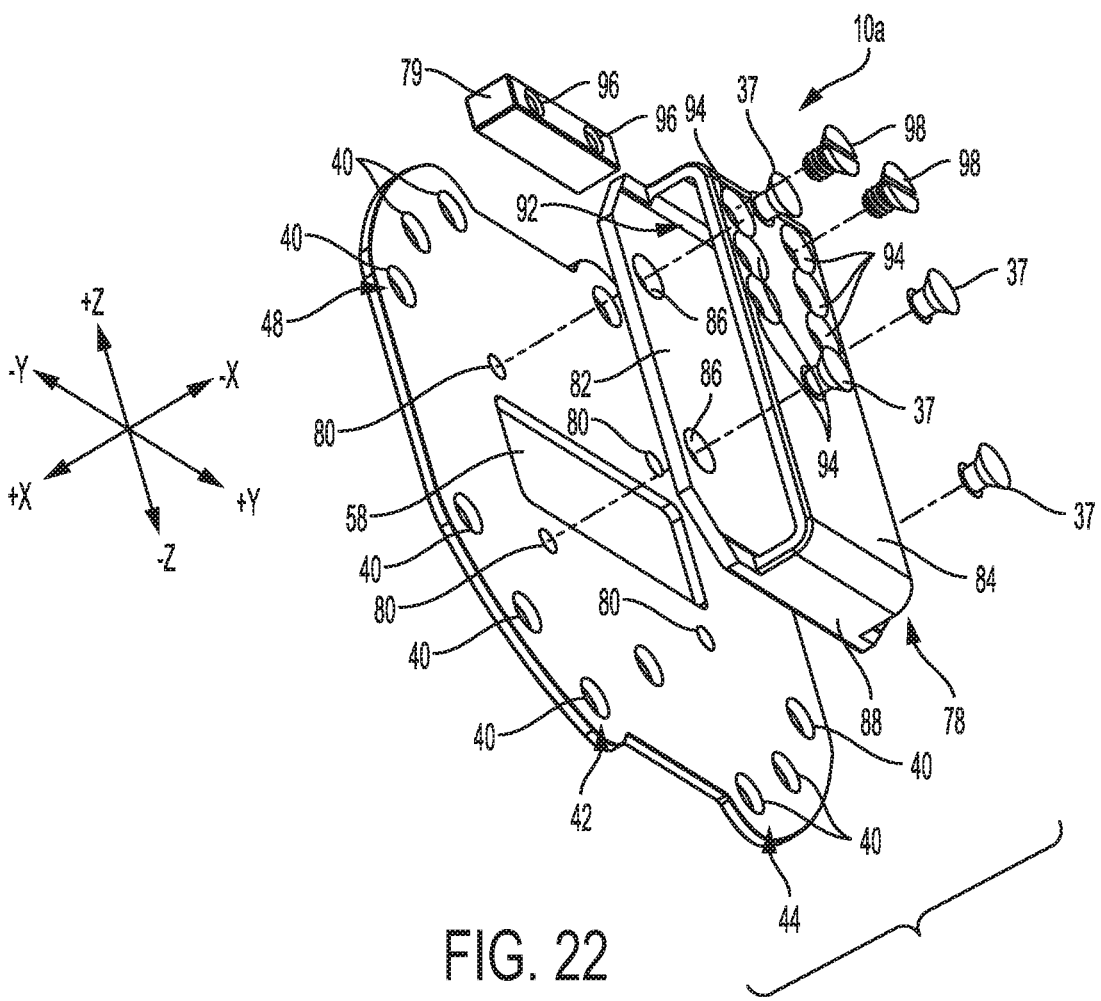
FIG. 22 is an exploded perspective view of the backing plate and belt restraint member shown in FIGS. 19-21.
Figure 23:
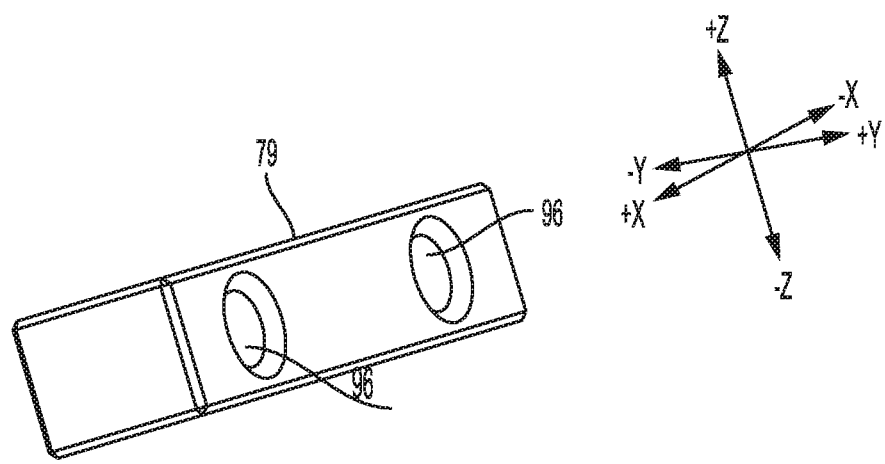
FIG. 23 is a side perspective view of a belt spacer of the mount shown in FIGS. 14-22.

The belt restraint member 78 is removably mounted on the backing plate 30*a*. The belt restraint member 78 has a base 82, and a cover 84 that adjoins the base 82, as shown in FIGS. 20-22. The base 82 and the cover 84 are unitarily formed; the base 82 and the cover 84 can be formed separately and attached by a suitable means such as welding in alternative embodiments.

The base 82 is a thin plate that contacts the backing plate 30a when the belt restraint member 78 is mounted on the backing plate 30a. The base 82 can have angled corners as shown in FIGS. 20 and 22, to prevent the base 82 from interfering with the holes 40 in the backing plate 30a. The base 82 has four attachment points in the form of holes 86 formed therein. The holes 86 each align with a corresponding one of the holes 80 in the backing plate 30a. Each aligned pair of holes 80 and holes 86 receives a corresponding fastener 37, to secure the belt restraint member 78 to the backing plate 30a. The fasteners 37 can be, for example, rivets. Other types of fasteners, such as screws, nuts and bolts, clamps, latches, and the like, can be used in the alternative.

The cover 84 has two side portions 88 that adjoin opposite ends of the base 82; and a top portion 90 that adjoins the side portions 88. The base 82, top portion 90, and side portions 88 can be unitarily formed. The base 82, top portion 90, and side portions 88 can be formed separately, and can be attached by a suitable means such as welding in alternative embodiments.

Figure 25:
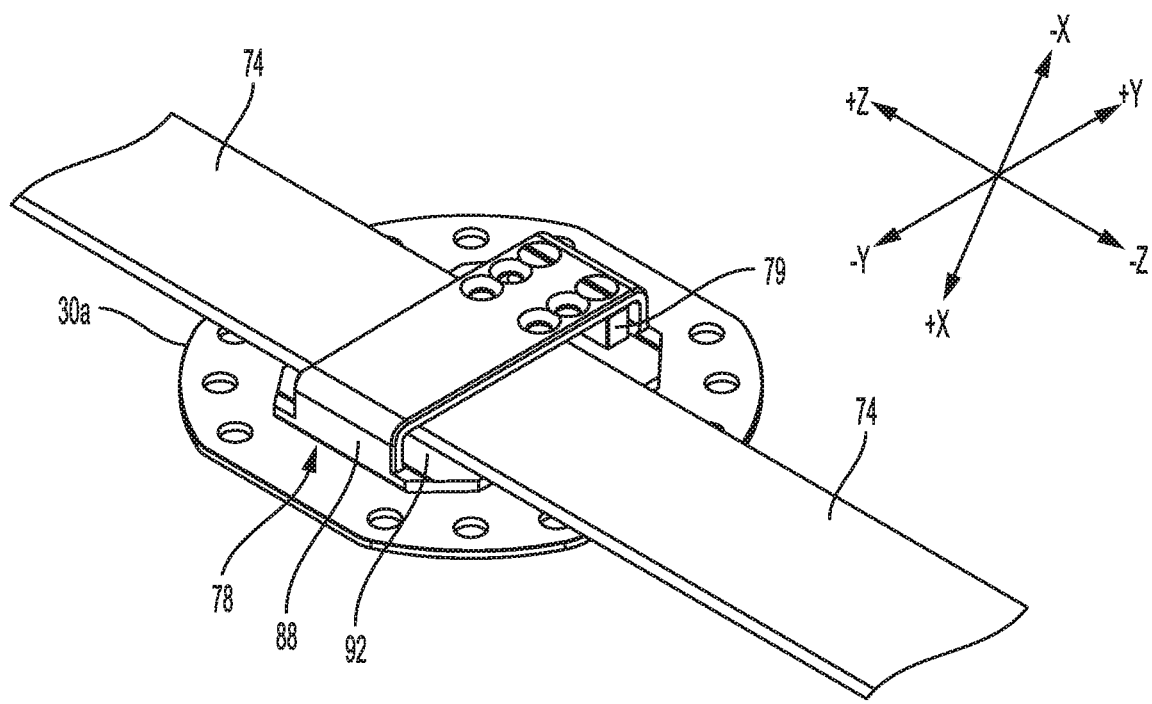
FIG. 25 is a bottom-side perspective view of the backing plate and belt restraint member shown in FIGS. 19-22 and 24, engaging the belt shown in FIG. 24.

The side portions 88, top portion 90, and base 82 define an opening 92, visible in FIGS. 21, 22, and 25, that receives the waist belt 74. The top portion 90 has six attachment points in the form of holes 94 formed therein. The holes 94 are arranged in three rows, with each row having two of the holes 94.

The belt spacer 79 has a rectangular cross section, as shown in FIGS. 21 and 22. The belt spacer 79 has a height, or "z" dimension, that is slightly less than the height of the opening 92 in the belt restraint member 78, so that the belt spacer 79 fits within the opening 92 with minimal clearance. The belt spacer 79 has a length, or "y" dimension, that approximately matches the length, or "y" dimension, of the cover 84.

The belt spacer 79 has two threaded holes 96 formed in a top thereof. The holes 96 are configured to align with the holes 94 in the top portion 90 of the cover 84. In particular, the belt spacer 79 can be secured three different positions on the belt restraint member 78, to reduce the width, or "z" dimension of the opening 92 if necessary, so that the width approximately matches the size of the particular waist belt 74 from which the mount 10a is being suspended. The belt spacer 79 is configured so that the holes 96 align with a first, or outermost row of holes 94 in the cover 84 when the belt spacer 79 is positioned in an outermost position in the opening 92, as depicted in FIG. 25. The belt spacer 79 can be secured in this position by threaded fasteners 98, which are received in the first row of holes 94 and the corresponding holes 96.

Similarly, the holes 96 align with a second, or middle row of holes 94 when the belt spacer 79 is positioned in a second, or middle position (not shown) in the opening 92, to the immediate left of the first position from the perspective of FIG. 25. The belt spacer 79 can be secured in this position by the threaded fasteners 98, which are received in the second row of holes 94 and the corresponding holes 96. The holes 96 align with a third, or innermost row of holes 94 when the belt spacer 79 is positioned in a third, or innermost position (not shown) in the opening 92, to the immediate left of the second position. The belt spacer 79 can be secured in this position by the threaded fasteners 98, which are received in the third row of holes 94 and the corresponding holes 96.

Figure 24:
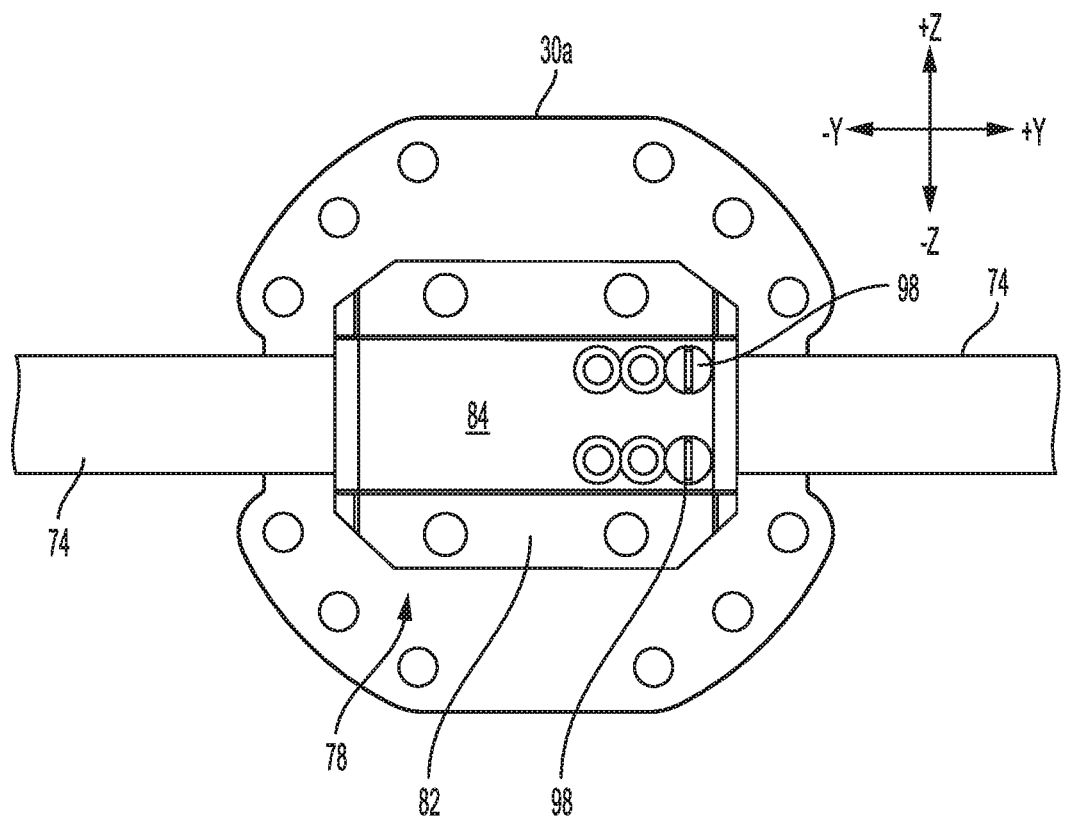
FIG. 24 is a side view of the backing plate and belt restraint member shown in FIGS. 19-22 engaging a belt.

The mount 10a and the attached sheath 12 can be suspended from the waist belt 74 by inserting one end of the waist belt 74 into, and through the opening 92, and pulling the waist belt 74 through the opening 92 until the slack is removed from the waist belt 74, as shown in FIGS. 24 and 25. The ends of the waist belt 74 can then be secured to each other by a belt buckle or other means. The waist belt 74, which is captured within the opening 92 by the base 82 and the cover 84, suspends the mount 10a and the attached sheath 12; and the orientation of the sheath 12 in relation to the mount 10a and the waist belt 74 can be varied as discussed above.

Figure 26:
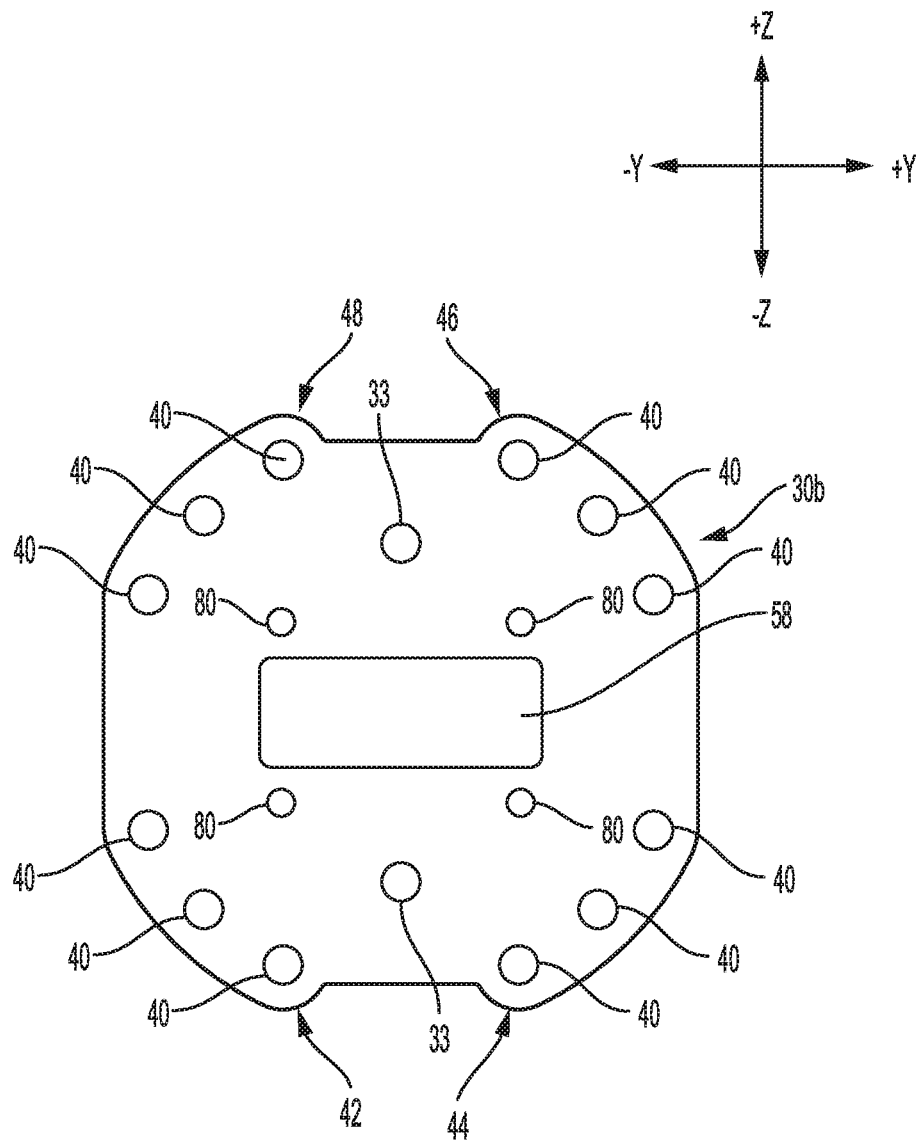
FIG. 26 is a side view of an alternative embodiment of the backing plates shown in FIGS. 6, 7, 10-12, 19, 22, 24, and 25.

FIG. 26 illustrates an alternative embodiment of the backing plate 30 and the backing plate 30a, in the form of a backing plate 30b. The backing plate 30b is configured so that the above-described retaining member 32 and, alternatively, the above-described belt restraint member 78, can be mounted therein. Thus, the backing plate 30b, retaining member 32, belt restraint member 78, and fasteners 34 can be provided together as a kit that provides the user with the options of assembling a strap-mounted mount such as the mount 10 and, alternatively, a belt-mounted mount such as the mount 10a.

The backing plate 30b can be identical to the backing plate 30, with the exception that the backing plate 30b includes the four holes 80, described above in relation to the backing plate 30a, that facilitate attachment of the belt restraint member 78. Thus, as shown in FIG. 26, the backing plate 30b includes the four holes 80 of the backing plate 30a; and the two holes 33 of the backing plate 30. With the exception of the additional holes 80, the above description of the backing plate 30 applies equally to the backing plate 30b, including the ability of the backing plate 30 to hold the sheath 12 in a variety of different orientations.

The backing plate 30b and the retaining member 32 can be assembled into a first configuration suitable for securing the mount, and the attached sheath 12, to the MOLLE webbing 19 using the strap 18. In this particular configuration, the retaining member 32 is mounted on the backing plate 30b in the manner described above in relation to the mount 10; and the belt restraint member 78 and the belt spacer 79 are not mounted or otherwise used. When configured in this manner, the resulting mount is functionally and operationally identical to the mount 10; and the above functional and operational descriptions of the mount 10, including the above-described ability for the sheath 12 to be attached to the mount 10 in twelve different orientations, apply equally to this configuration of the mount.

The backing plate 30b, belt restraint member 78, and if needed, the belt spacer 79 can be assembled into a second configuration suitable for mounting on the waist belt 74. In this particular configuration, the belt restraint member 78 and the belt spacer 79 are mounted on the backing plate 30b in the manner described above in relation to the mount 10a; and the retaining member 32 is not mounted or otherwise used. When configured in this manner, the mount is functionally and operationally identical to the mount 10a; and the above functional and operational descriptions of the mount 10a, including the above-described ability for the sheath 12 to be attached to the mount 10a in twelve different orientations, apply equally to this configuration of the mount.

The backing plate 30b thus permits a user to quickly and easily configure, or reconfigure a mount for mounting the knife sheath 12 on a strap, such as a MOLLE strap 18 or, alternatively, on a waist belt. Thus, the backing plate 30b, retaining member 32, belt restraint member 78, belt spacer 79, and fasteners 34, 98 can be provided together as a kit that provides the user with the ability to mount the sheath 12 in these two different manners, without a need to separately procure two different mounts.

As used herein, the term "about" in reference to a numerical value means plus or minus 10% of the numerical value of the number with which it is being used.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A mount for supporting a knife sheath from a strap, comprising:
    a backing plate having an outer perimeter, an opening, and a plurality of attachment points located between the outer perimeter and the opening;
    a retaining member configured for mounting on the backing plate so that the retaining member spans a first portion of the opening and a second portion of the opening remains exposed, a first side of the retaining member faces the backing plate and the opening, and the strap can engage the first side of the retaining member by way of the opening; and
    a plurality of fasteners configured to secure the sheath to the mount by way of the attachment points, wherein:
        the backing plate is configured so that, when the sheath is in a first orientation in relation to the mount, a first and a second of the attachment points in the backing plate align with a respective first and second attachment point in the sheath; and
        the backing plate is further configured so that, when the sheath is in a second orientation in relation to the mount, a third and a fourth of the attachment points in the backing plate align with the respective first and second attachment points in the sheath.

2. The mount of claim 1, wherein the backing plate is further configured so that, when the sheath is in a third orientation in relation to the mount, a fifth and a sixth attachment point in the backing plate align with the respective first and second attachment points in the sheath.

3. The mount of claim 1, wherein the attachment points are holes configured to receive the fasteners.

4. The mount of claim 2, wherein the second orientation is angularly offset from the first orientation by about 20 degrees; and the third orientation is angularly offset from the second orientation by about 20 degrees.

5. The mount of claim 2, wherein: the first, third, and fifth attachment points in the backing plate are located at a first corner of the backing plate; and the second, fourth, and sixth attachment points in the backing plate are located at a second corner of the backing plate.

6. The mount of claim 2, wherein the backing plate is further configured so that, when the sheath is in a fourth orientation in relation to the mount, the first and second attachment points in the backing plate align with a respective third and fourth attachment point in the sheath.

7. The mount of claim 6, wherein the fourth orientation is offset from the first orientation by about 90 degrees.

8. The mount of claim 5, wherein the backing plate is further configured so that:
    when the sheath is in the first orientation in relation to the mount, a seventh and an eighth of the attachment points in the backing plate align with a respective third and fourth attachment point in the sheath;
    when the sheath is in the second orientation in relation to the mount, a ninth and a tenth attachment point in the backing plate align with the respective third and fourth attachment points in the sheath;
    when the sheath is in the third orientation in relation to the mount, an eleventh and a twelfth attachment point in the backing plate align with the respective third and fourth attachment points in the sheath;
    the seventh, ninth, and eleventh attachment points in the backing plate are located at a third corner of the backing plate; and
    the eighth, tenth, and twelfth attachment points in the backing plate are located at a fourth corner of the backing plate.

9. The mount of claim 1, wherein the retaining member is a plate having a substantially rectangular shape.

* * * * *